United States Patent
Megeid

(10) Patent No.: US 6,636,271 B1
(45) Date of Patent: Oct. 21, 2003

(54) APPARATUS AND METHOD FOR PLAYING BACK A RECORDED VIDEO SIGNAL IN A TIME COMPRESSED MANNER

(75) Inventor: Magdy Megeid, Zurich (CH)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 09/582,252

(22) PCT Filed: Jan. 7, 1999

(86) PCT No.: PCT/US99/00328

§ 371 (c)(1),
(2), (4) Date: Nov. 9, 2000

(87) PCT Pub. No.: WO99/35835

PCT Pub. Date: Jul. 15, 1999

Related U.S. Application Data
(60) Provisional application No. 60/070,620, filed on Jan. 7, 1998.

(51) Int. Cl.[7] .................................................. H04N 5/76
(52) U.S. Cl. ........................ 348/559; 348/564; 348/705; 386/46
(58) Field of Search ................................. 348/559, 564, 348/563, 565, 567, 568, 705, 715; 386/46, 109, 120, 39, 35, 27

(56) References Cited

U.S. PATENT DOCUMENTS

| | | | |
|---|---|---|---|
| 4,914,516 A | * 4/1990 | Duffield | 348/565 |
| 5,241,428 A | 8/1993 | Goldwasser et al. | |
| 5,311,317 A | * 5/1994 | Ogura et al. | 348/725 |
| 5,317,399 A | * 5/1994 | Satake et al. | 348/571 |
| 5,329,320 A | 7/1994 | Yifrach | |
| 5,438,423 A | 8/1995 | Lynch et al. | |
| 5,621,473 A | * 4/1997 | Hill | 348/559 |
| 5,822,493 A | * 10/1998 | Uehara et al. | 386/109 |
| 6,134,377 A | * 10/2000 | Komedashi et al. | 386/46 |
| 6,233,390 B1 | * 5/2001 | Yoneda | 386/46 |
| 6,490,000 B1 | * 12/2002 | Schaefer et al. | 348/553 |

FOREIGN PATENT DOCUMENTS

| | | | |
|---|---|---|---|
| EP | 713334 | 5/1996 | H04N/5/907 |
| EP | 726574 | 8/1996 | G11B/27/034 |

OTHER PUBLICATIONS

European Search Report dated Apr. 13, 1999.

* cited by examiner

Primary Examiner—John Miller
Assistant Examiner—Jean W. Désir
(74) Attorney, Agent, or Firm—Joseph S. Tripoli; Paul P. Kiel

(57) ABSTRACT

A signal processing method and apparatus provides a capability of storing a portion of an input signal representing a received program and accessing the stored information to provide a signal component representing a time-compressed version of the portion of the program during a playback mode of operation. When viewed, the time-compressed signal produced during playback provides the portion of the program in a fraction of the original time duration of the portion of the program. Playback occurs at a rate faster than the rate at which new data is stored and, as a result, there will be point in time at which the "past" signal produced during playback and the received signal, or original input video signal, coincide in time. This point in time is detected and the output signal is automatically switched back to the received program signal.

11 Claims, 7 Drawing Sheets

APPARATUS AND METHOD FOR PLAYING BACK A RECORDED VIDEO SIGNAL IN A TIME COMPRESSED MANNER

This application claims the benefit of provisional application No. 60/070,620, filed Jan. 7, 1998.

FIELD OF THE INVENTION

The present invention relates to digital signal processing in audio-video systems such as television receivers (with or without a display device) and set-top boxes such as digital satellite receivers.

BACKGROUND

Recording of audio-video signals, for example using a video cassette recorder (VCR), is common practice. Recording is useful when the viewer wants to watch a program later at a convenient time. When the recording is played back, the viewer can select the parts of the program he wants to see, or playback can be interrupted at any time, e.g. to answer a telephone call. However, when viewing a program as it is received, the viewer cannot interrupt the program. Talking to someone or leaving the room, may prevent a viewer from viewing part of a program being received in "real time" (i.e., not recorded on video tape) such as from a broadcast satellite signal provider, a broadcast television station, or a cable television source.

SUMMARY OF THE INVENTION

The foregoing problems are overcome by providing a method for processing a received video signal representing a video program comprising the steps of processing digital data representing a portion of the video program occurring during a first interval for producing a first signal component; the first signal component representing the portion of the video signal compressed in time; providing an output signal having the first signal component during a second interval; and replacing the first signal component in the output signal with a second signal component representing the input video signal in response to the end of the second interval.

In accordance with an aspect of the invention, the first signal component is included in the output signal during a playback mode of operation and new time-compressed information continues to be stored during playback mode. Output of the time compressed information during playback mode occurs at a rate faster than the rate at which new data is stored. A point in time at which data being output is the same as data being stored is detected as indicating the end of the second interval and the first signal component is automatically replaced by the second signal component in the output signal in response to detection of the end of the second interval.

The invention may be implemented in a system for producing an output signal representing a multi-picture image during a multi-picture display mode of operation. The output signal is suitable for coupling to a display device for simultaneously displaying first and second image regions. The first signal component is displayed in a first image region and the second signal component is displayed in the second image region. Activation of the playback mode automatically activates the multi-picture display mode and the multi-picture display mode automatically terminates in response the end of the second interval.

Another aspect of the invention involves automatically modifying display characteristics in response to activation of the playback mode of operation.

BRIEF DESCRIPTION OF THE DRAWING

The invention may be better understood by referring to the following detailed description and the drawing in which.

DETAILED DESCRIPTION

Figure 1:
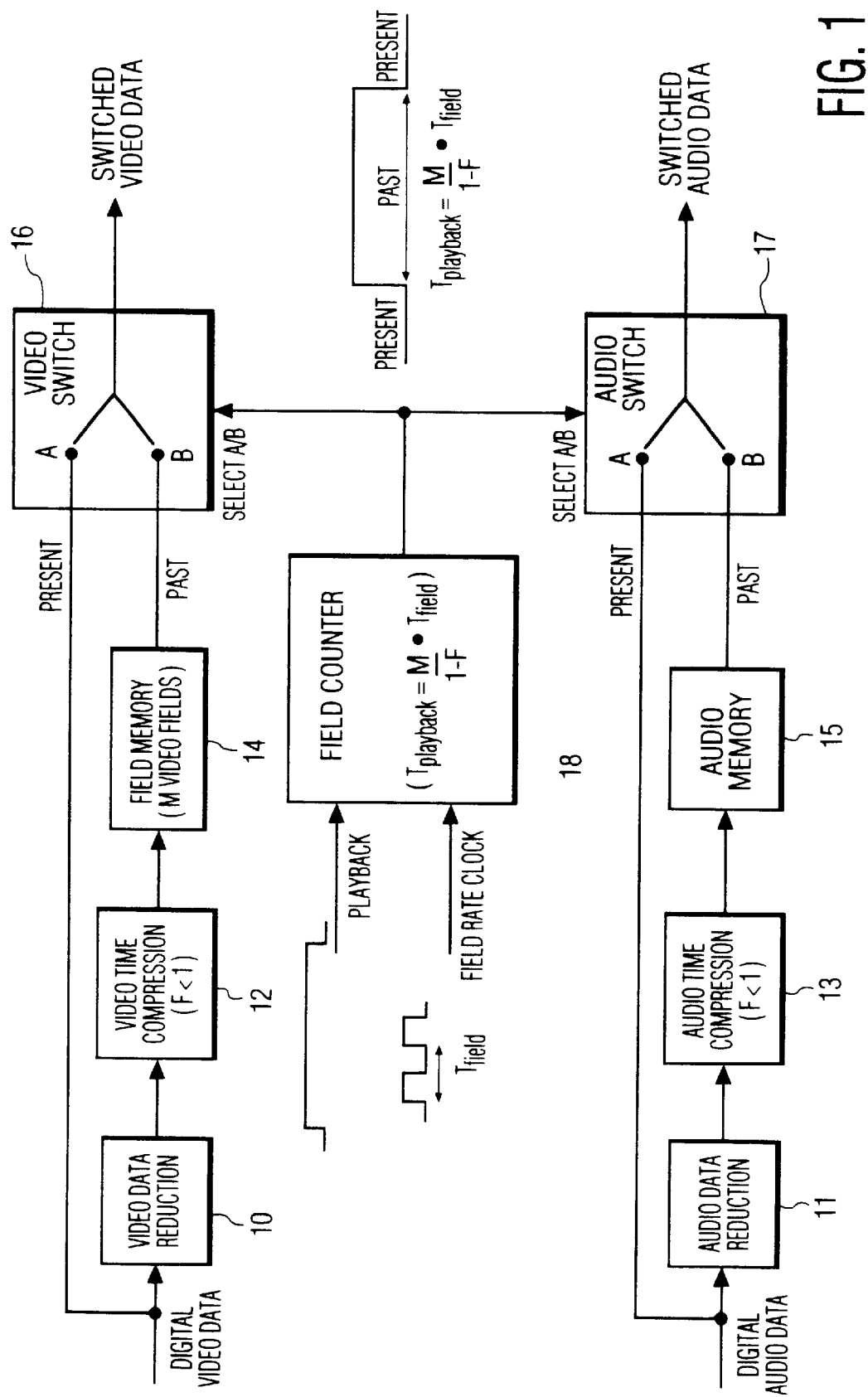
FIG. 1 shows, in block diagram form, an audio/video signal processing system incorporating aspects of the invention.

FIG. 1 shows a block diagram of a system incorporating aspects of the invention which implement a playback capability referred to herein as "back to the present". In the figures, relatively wide signal lines represent busses conveying multiple-bit parallel digital signals and relatively narrow signal lines represent connections conveying single-bit control or analog signals. In FIG. 1, the video and audio input signals, "digital video data" and "digital audio data", respectively, are digital data signals that are first processed in respective data reduction circuits 10 and 11. Video and audio data reduction methods are known to those skilled in the art and will not be discussed here. For example, MPEG encoding is one well known data reduction (or compression) approach. If one or the other of the input signals is already compressed, e.g., an input signal is MPEG encoded, the corresponding data reduction function may not be needed.

Each data reduction circuit is followed by a respective one of data time-compression circuits 12 and 13. The time-compression circuits reduce the data rate, e.g., by discarding part of the data. A time compression factor "F" is defined as:

F=data rate of output signal/data rate of input signal, where F<1.

Following time-compression, the video and audio data are stored in respective memories 14 and 15 that are organized as first-in-first-out (FIFO) memories. Although two memories are shown in FIG. 1, it is possible to use one memory for storing both audio and video signals. Playback time depends on the amount of stored data and, therefore, memory size. Depending on memory size, playback time may vary from several seconds to several minutes. Video memory 14 has sufficient capacity to store "M" video fields. Assuming PAL and NTSC standards, one video field corresponds to the vertical deflection rate, i.e., one video field occurs every 20 ms or 16.683 ms, respectively. In other digital systems, e.g., MPEG, one field could be defined in a different way. For example, one field in an MPEG encoded signal may correspond to a predetermined number of packets of MPEG encoded digital data.

The audio and video memory outputs are coupled to input "B" of respective audio and video switches 16 and 17. Input "B" of each switch is also labled "past" indicating that the signal coupled thereto represents the video or audio program at a past time, i.e., the signal represents stored information. The original audio and video input signals are coupled to input "A" of the respective switch. The "A" inputs are also designated as "present" input indicating that the signal coupled thereto represents the video or audio program at the present time, i.e., not stored. Both switches are controlled by signal "select A/B" which is the output signal of a field counter. The input signals of this counter are "playback" and "field rate clock". Normally signal "select A/B" is at a first logic level, e.g., "0" level, that selects the "present" signal at input "A". When the user wishes to playback the "past" video, the user activates the "back to the present" capability, for example, by pressing a "playback" key on the remote control. Activation of the playback feature results in the playback signal at the input of the field counter 18 changing from the first logic level, e.g., a low logic "0" level, to a second logic level, e.g., a high logic "1" level. This change in logic level enables the counter to start counting at a rate equal to the field rate clock. At the same time, output signal "select A\B" changes to the second logic level, e.g., to logic "1", so that the "past" signal at input B is selected.

After playback time equal to $T_{playback}$ the counter 18 is reset, whereby its output signal "select A/B" goes again to the first logic level, e.g., logic "0" level, and the original received signal at input "A", i.e., the "present" signal is selected. The count time "$T_{playback}$" is determined from the following equation:

$$T_{playback} = \left(\frac{M}{1-F}\right) \cdot T_{field}$$

where $T_{field}$ is the field period. For PAL systems, $T_{field}$=20 ms, while for NTSC systems, $T_{field}$=16.683 ms. The playback time ends exactly at the moment when the video playback sequence "past" matches the received signal "present". The following description and an example provided below further explains the operation of the described system.

Figure 2:
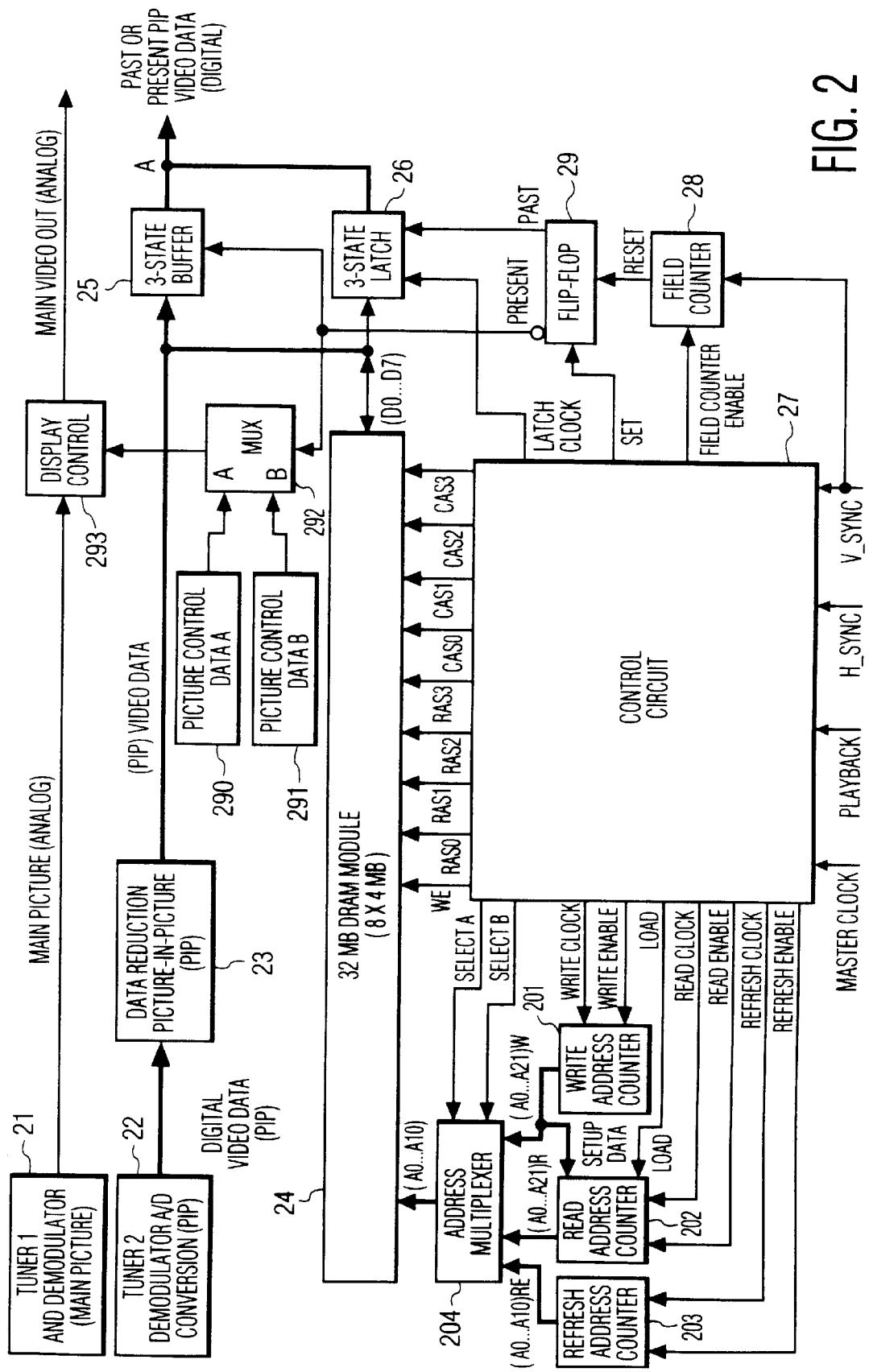
FIG. 2 shows, in block diagram form, an embodiment of a video signal processing section of the system shown in FIG. 1.

FIG. 2 shows in more detail an exemplary embodiment of a portion of the system shown in FIG. 1. The system shown in FIG. 2 comprises a portion of a television receiver which includes a multi-picture feature. That is, the system in FIG. 2 can produce an output signal having a first signal component representing a main picture and a second signal component representing a second or auxiliary picture. The embodiment shown in FIG. 2 relates to a picture-in-picture, or PIP, system, in which the auxiliary picture is a small picture inset into the main picture. Embodiments incorporating the invention other than that shown in FIG. 2 are possible. For example, the invention is applicable to picture-outside-picture, or POP, systems in which the auxiliary picture is displayed outside of, e.g., along side of, the main picture. Also, the embodiment in FIG. 2 includes two tuners 21 and 22 for implementing the multi-picture feature. However, the invention is also applicable to single tuner systems such as a system shown in FIG. 6 or a system similar to that shown in FIG. 2 in which a second video signal is received from a source other than a second tuner included in the system, e.g., from a tuner in an external device such as a VCR.

In FIG. 2, tuner 21 receives the main signal and tuner 22 receives the second signal used to produce the signal component representing the auxiliary, or PIP, image. In accordance with an aspect of the invention, in an embodiment such as that shown in FIG. 2, the output of the second tuner, i.e., tuner 22, is used to provide the signal that is stored to provide playback and tuner 22 is automatically tuned to the same channel as tuner 1 as long as the PIP window is not displayed on the screen. This ensures that the stored program for playback is the same as the program watched by the user in the main picture, i.e., the output of tuner 21.

The demodulated and analog-to-digital converted PIP video data is coupled to a data reduction circuit 23 that is already included in the system as part of the PIP feature. The output signal of the data reduction circuit 23 is coupled to the bi-directional data input/output "D0 . . . D7" of a 32 MB DRAM module 24 and to the input of a 3-state buffer 25 and additionally to the input of a 3-state latch 26. The 32 MB memory is a cost-effective module, which is widely used in computers. It comprises eight, 4 MB DRAMs connected in parallel.

A "playback" signal at the input of control circuit 27 is normally at a first logic level, e.g., a low level or logic "0", indicating playback is disabled, while "present" and "past" output signals of the flip-flop are normally at logic levels, e.g., high "1" and low "0", respectively, indicating that the output of buffer 25 is enabled thereby selecting the "present" signal while the output of latch 26 is disabled thereby de-selecting the "past" signal. That is, the 3-state buffer is active and the 3-state latch is inactive in a high impedance state. Thus, the video data at node "A", the common output of the 3-state buffer and the 3-state latch, is the received "present" PIP signal. However, the video data signal at node A is not displayed on the screen during non-playback mode because the "present" PIP signal represents the same video program information as the main picture signal (except for data reduction of the PIP signal) and, therefore, display of a PIP image that is substantially the same as a main image is not necessary.

If the viewer activates playback mode, e.g., by pressing the "playback" key on the remote control, the "playback" signal at the input of the control circuit 27 changes state, e.g., to a second logic level such as a high "1" level. As a result, both trigger pulse signals "field counter enable" and "set" at the output of the control circuit trigger the field counter 28 and the flip-flop 29. In response, the field counter 28 starts to count and the flip-flop is set, whereby the "present" and the "past" output signals of the flip-flop change state, e.g., to low "0" and high "1" level, respectively. This causes the 3-state buffer to be inactive in a high impedance state and the 3-state latch to be active. In this case, the data at the common output of the 3-state buffer and the 3-state latch is the stored "past" PIP signal which is now automatically displayed on the screen for playback, in the form of a PIP window. The latch output signal is synchronous to the rising edge of the latch clock which, occurs during a memory read cycle.

The field counter 28 counts field intervals occurring in the input video signal to determine the duration of the playback interval. When the count produced by the counter indicates that a predetermined number of field intervals corresponding to the playback time of "$T_{playback}$" have occurred, the counter resets the flip-flop whereby "present" and "past" control signals change its logic levels to high "1" and to low "0" level, respectively, indicating that the playback interval has ended. Detection of the end of the playback interval as indicated by the change in the "past" and "present" signal levels causes the system to automatically change to non-playback mode and causes "present" received data to appear again at the output of the 3-state buffer. At the same time, PIP display is automatically disabled and the PIP window automatically disappears from the screen to provide a display of only the main picture.

There are three address counters used to address the DRAM module 24. These counters are: 22 bit write-address-counter 201 with outputs (A0 . . . A21)W, 22 bit read-address-counter 202 with outputs (A0 . . . A21)R and 11 bit refresh-address-counter 203 with outputs (A0 . . . A10)RE.

The 22 bits are necessary to address 4 MB. Since the DRAM only has 11 address inputs, the address counters must be multiplexed. The address multiplexer 204 is controlled by the "select A" and the "select B" signals. Typical DRAM control signals are also shown in FIG. 2: WE, RAS0, RAS1, RAS2, RAS3, CAS0, CAS1, CAS2, CAS3. The frequency of the master clock at the input of the control circuit is 17.7344 MHz which is 4 times the PAL color subcarrier frequency (17.7344 Mhz=4×4.4336 MHz). This clock frequency is used in PIP processors such as the "PIP2250 Picture-in-Picture Processor" manufactured by ITT.

Read-address-counter 202 is a programmable counter, i.e. the outputs may be synchronously preset to either logic level. A low level at the load input of counter 202 disables the counter and causes the counter outputs to become the preset values (signal "setup data") after the next clock pulse. The preset values in signal "setup data" are produced at the outputs of the write-address-counter 201. At the beginning of the playback time "$T_{playback}$" the load control signal "load" at the input of the read-address-counter 202 changes to a logic level, e.g., a low level, that enables the preset operation. Assuming that at this moment the current address at the output of the write-address-counter is equal to "N", the preset address for the read-address-counter will take place at the next clock pulse and will be "N+1". A read cycle occurs before a write cycle, so that the data read from address "N+1" is the "oldest" video information that has been stored in the memory. This data is the start of the playback signal.

In accordance with another aspect of the invention, the system shown in FIG. 2 also provides for focusing the viewer's attention on the playback signal display during playback mode. Specifically, the system shown in FIG. 2 includes units 290, 291, 291, and 293 for providing the playback display emphasis feature. This feature and the operaiton of units 290 through 293 are explained in detail below.

Figure 3:
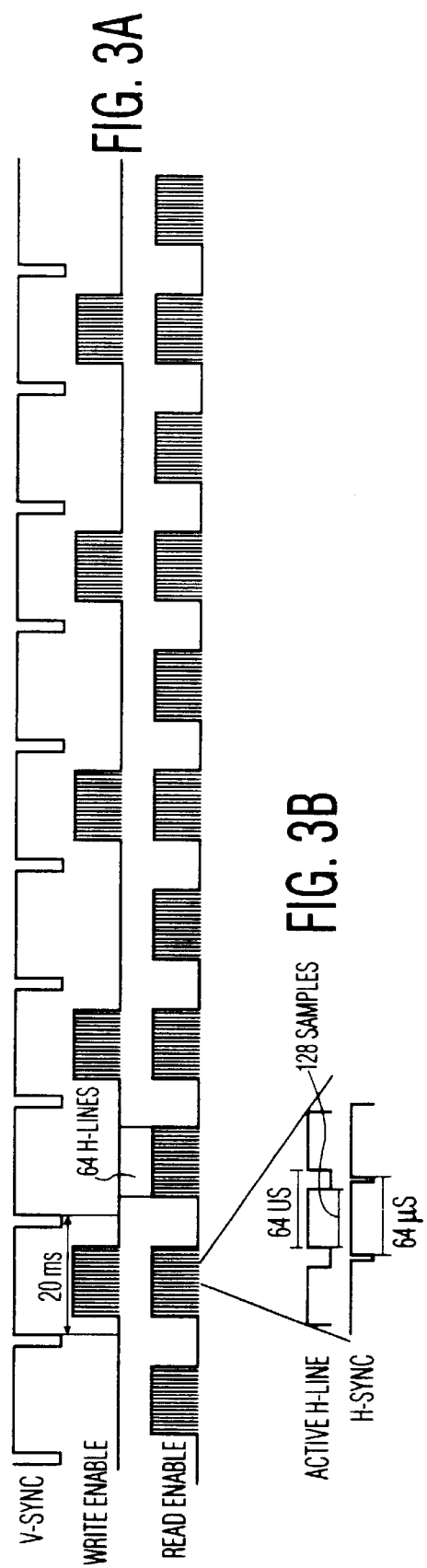
FIGS. 3, 4 and 5 show signal timing diagrams useful for understanding the operation of the system shown in FIG. 2.

FIG. 3 shows signal waveforms illustrating how video time compression is realized. In the exemplary embodiment, every second video field is stored (written) in the memory, i.e. one of two field is ignored (F=½). Other compression factors are also possible, e.g. writing 2 fields out of 3 which results in F=⅔ or writing 4 out of 6 with F=⅙. In FIG. 3, the write enable signal is activated every second field, while the read enable signal is activated every field (see also FIG. 2). For a compression factor of F=½, the resulting "stored" PIP signal is two times faster than the original picture. It can be seen from FIG. 3 that 64 PIP-lines are stored every two fields, and that every line contains 128 samples. These numbers only represent possible values and other values could be used. Only the active part of the video signal is stored, i.e. no synchronization signals are stored. The compression operation stores data representing a portion of a video program in the received signal during a first interval which encompasses the portion of the video program. The time compressed data is output during a second interval which is the playback interval.

Figure 4:
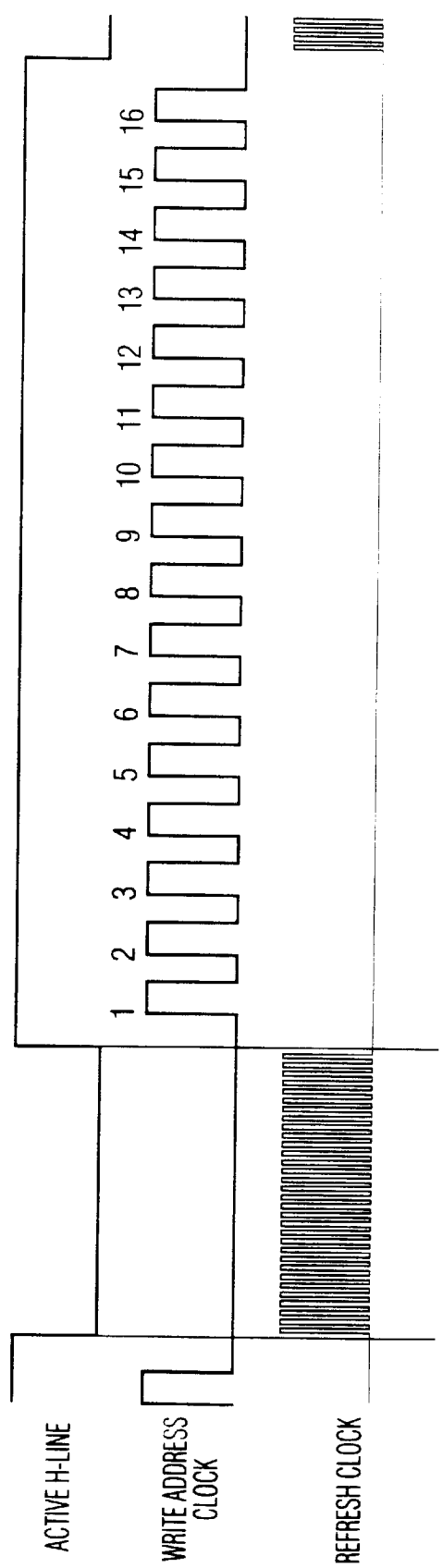

FIG. 4 shows signal waveforms illustrating the write clock of the write address counter. There are 16 address cycles per video line. Since there are 8 parallel blocks of DRAMS, the same address is used to store 8 samples in 8 different blocks. In this way, the total number of samples per line is equal to 128 samples (8×16). The refresh clock is independent of the write and read clock and, advantageously, can be much faster.

Figure 5:
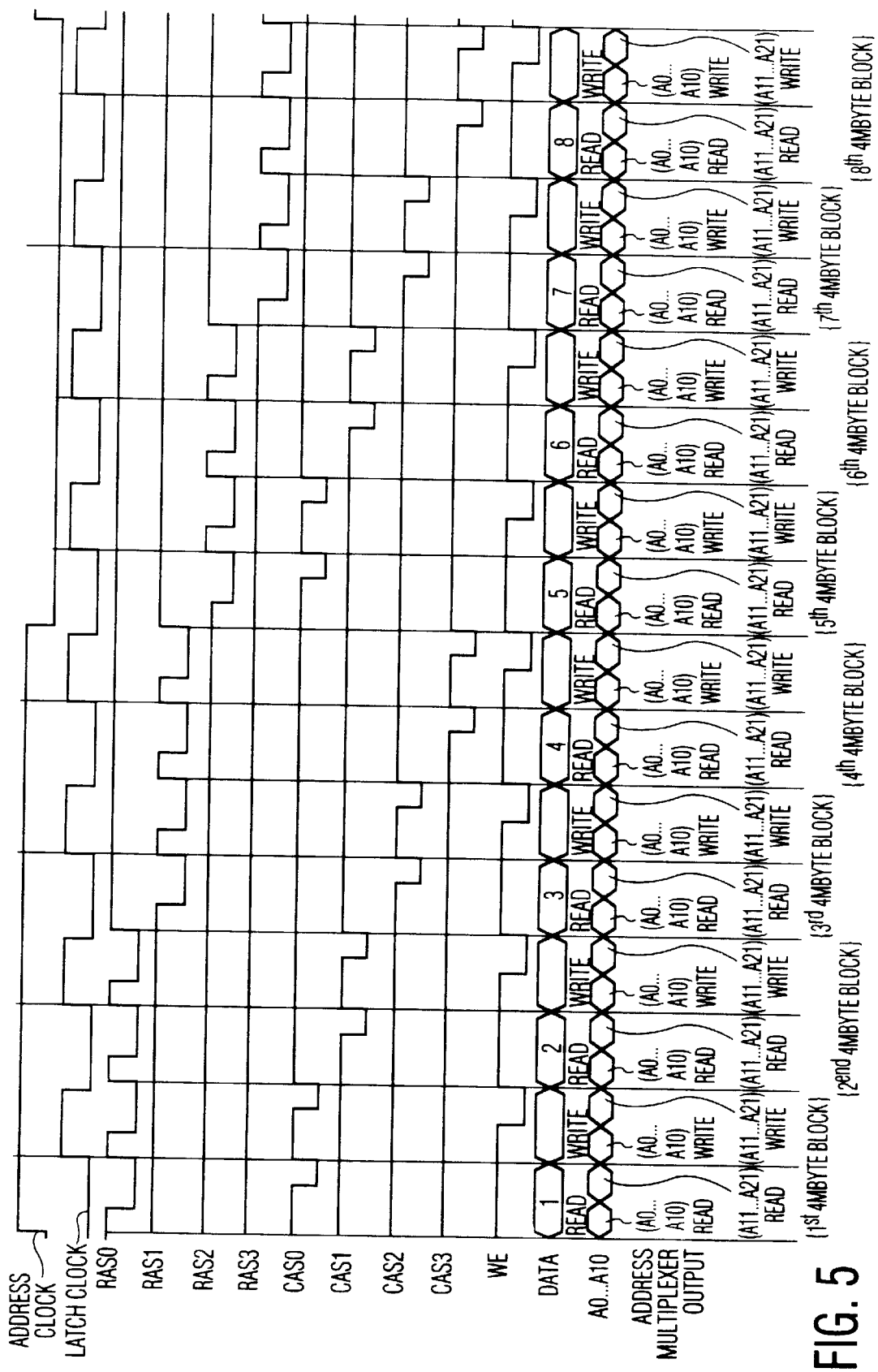

FIG. 5 shows waveforms illustrating 8 read/write cycles. The DRAM control signals shown in FIG. 5 are typical DRAM control signals familiar to those skilled in the art. It should be noted that, in accordance with an aspect of the invention, a memory read cycle must take place before a memory write cycle, i.e., the past data is first read before overwriting it with the present data.

Figure 6:
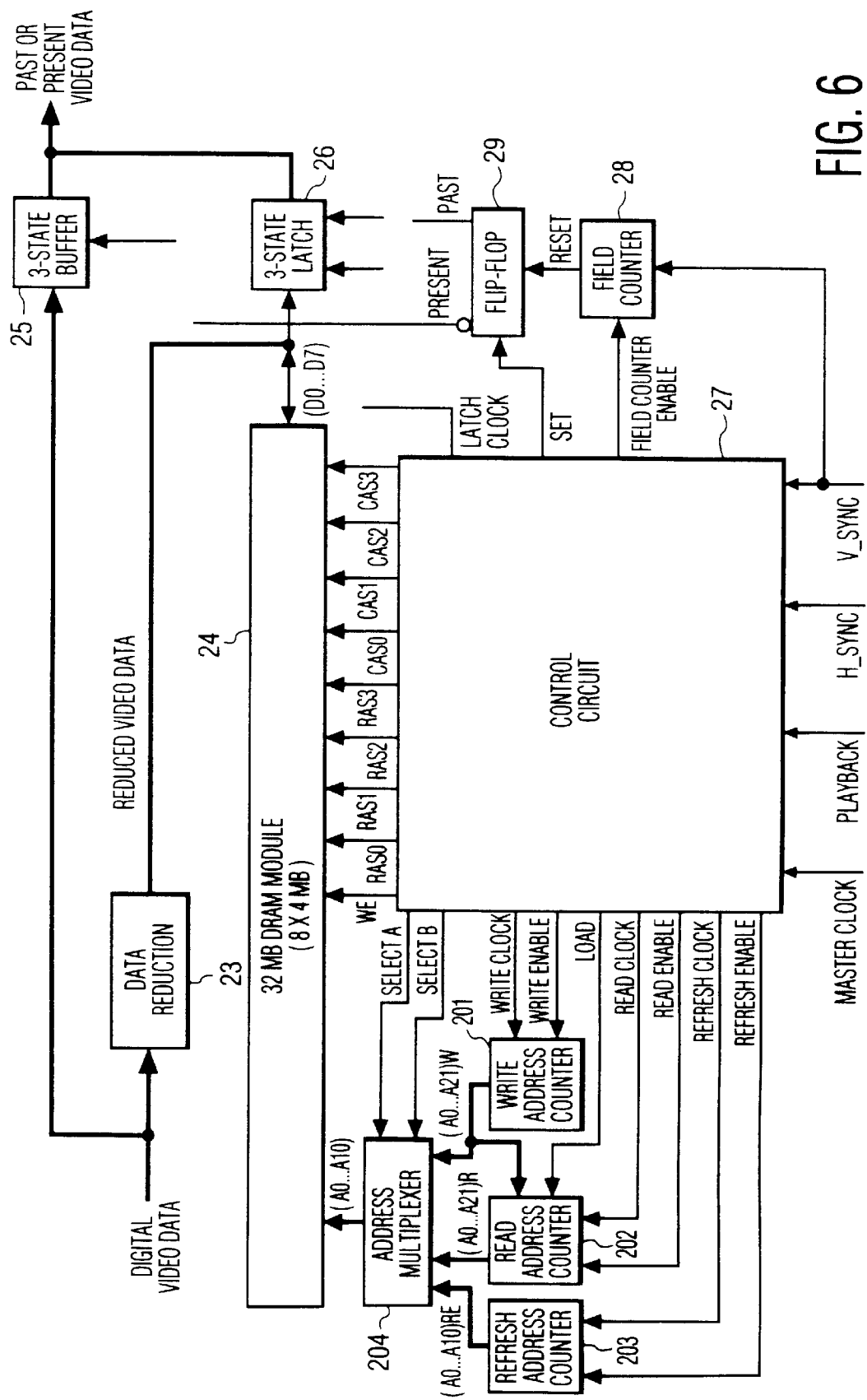
FIG. 6 shows, in block diagram form, another embodiment of the video signal processing section of the system shown in FIG. 1.

FIG. 6 shows a block diagram of an embodiment of apparatus incorporating the invention and not including a multi-picture feature such as that shown in FIG. 2. The features shown in FIG. 6 are similar to like-numbered features in FIG. 2 and will not be explained again in detail here. Because the system in FIG. 6 does not provide an auxiliary picture "window" in which to display playback of the "past" video, the complete received "present" picture disappears from the screen during playback and the "past" video appears instead. After the playback time "$T_{playback}$" the original video picture appears again.

Because there is only a main image produced by the system shown in FIG. 6, which is the playback image during playback mode, it is not possible to see the image associated with the present signal during playback. Therefore, it may appear that a user would miss the portion of the program occurring in the present signal during playback. However, an aspect of the invention, involving continuing to store time-compressed data during playback, solves this problem. That is, while playback is occurring, new time compressed data is being stored (write operation) in the memory locations from which data has already been played back (read operation). Playback occurs at a greater rate than the rate at which new data is stored. That is, the rate of memory read operations to produce the playback signal exceeds the rate of memory write operations which store new data during playback. Thus, playback will eventually catch up to the storing of new data during playback until at a point in time, the data just recorded is immediately played back. At this point in time, playback has reached the present time and is "back to the present". The system detects this point in time using the field counter as described above, automatically cancels the playback operation, and resumes display of the present signal. Storing of compressed data occurs during a first interval and playback, or reading of the compressed data, occurs during a second interval. It is the end of the second interval, i.e., the end of playback, that indicates the "back to the present" condition.

The described problem does not exist in the system shown in FIG. 2 because playback appears in the auxiliary image and the present signal is displayed in the main image. The user sees the present signal during playback and does not miss portions of the program. Therefore, continuing to store data during playback is not necessary for the system shown in FIG. 2. However, continuing to store data during playback is advantageous in the system of FIG. 2. For example, implementing this feature in the system of FIG. 2 would ensure that the PIP image is the same as the main image at the time that playback ends and the PIP image is automatically removed by termination of playback mode. Additionally, it might be confusing for the viewer to see two different video signals especially because the audio signal of the past signal (small picture) is active (being output) during playback mode of operation.

Another aspect of the invention involves focusing the viewer's attention on the image produced in response to the playback signal during playback, e.g., the auxiliary picture produced by the system shown in FIG. 2. This can be done using various approaches. For example, the present signal display (e.g., the main image produced by the system shown in FIG. 2) color can be shifted, the present signal display can be displayed in black and white, the contrast and/or brightness of the present signal display can be reduced with respect to the playback signal display, the contrast and/or brightness of the playback signal display may be increased with respect to the present signal display, or a combination of these techniques can be used. At the end of the playback time the original display characteristics are reset.

An embodiment of the playback signal emphasis aspect of the invention is included in the system shown in FIG. 2. Specifically, data representing picture control characteristics (for example, one or more of color, contrast, and brightness parameters) for the present display and for the past display are stored in units 290 and 291, respectively. These control characteristics are coupled to a display control unit 293 through a selector, or MUX, 292. MUX 292 is controlled by signal "present" from flip-flop 29. Thus, when playback mode is inactive (signal present at logic 1), MUX 292 couples the output of unit 290 to a control input of unit 293. As a result, the normal picture control characteristics for the present, or main picture, display are used to control and produce the main picture. Thus, the main picture will exhibit its "normal" characteristics such as color, brightness and contrast. If playback mode is active (signal "present" at logic 0), MUX 292 couples the output of unit 291 to the control input of unit 293 causing the display controller to modify the present picture signal in accordance with the "past" mode display parameters. For example, when playback mode is activated, the data stored in unit 291 may cause display control unit 293 to change the color of the main or present signal, change the signal to black and white, reduce the contrast, reduce the brightness, or some combination of these modifications. Thus, the present signal is de-emphasized which, in effect, emphasizes the playback display causing the viewer's attention to be focused on the playback display. When playback ends, display of the present signal returns to normal.

Various modifications of the playback signal emphasis feature are possible. For example, although FIG. 2 shows display control unit 293 in the main (present) picture signal processing path for modifying the main picture, a similar feature could be included in the PIP (past) video path for modifying the PIP or past image. That is, when playback mode is active, the past image could be enhanced (for example, brightness and/or contrast increased), thereby emphasizing the playback display. Also, a display control unit such as unit 293 could be included in either or both of the present and past signal paths for independently or simultaneously controlling the display characteristics of the past and present images. Also, other methods of enhancing the playback image could be used. For example, in a mult-picture display system such as that shown in FIG. 2, the playback image which, as described above, is displayed in the auxiliary image could, instead, be displayed in the main image. That is, a "swap" of the main and auxiliary images could occur in response to activation of the playback feature. Termination of the playback feature would result in a swap again to restore the present signal to the main display.

Figure 7:
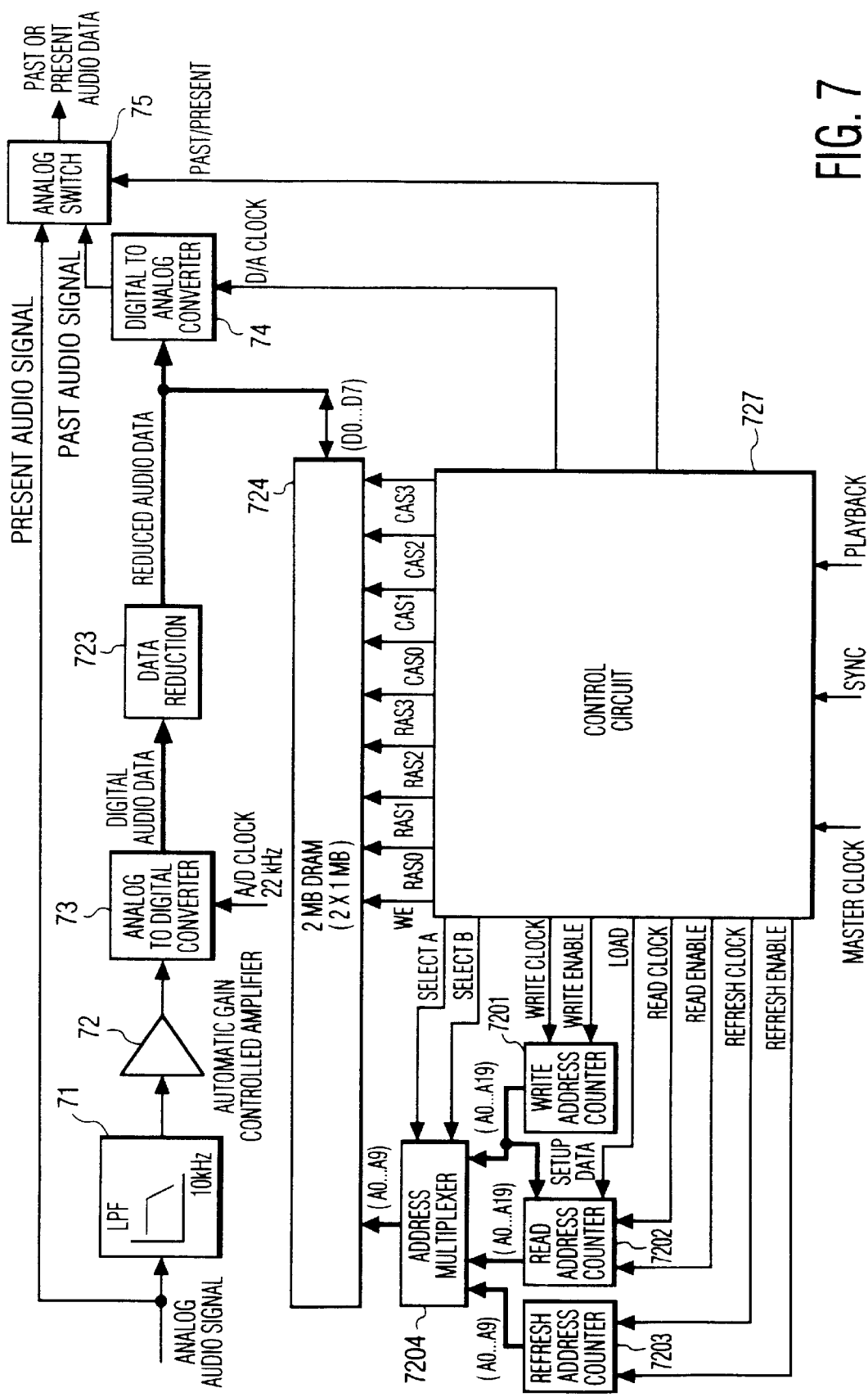
FIG. 7 shows an embodiment of an audio signal processing section of the system shown in FIG. 1.

FIG. 7 shows an embodiment providing audio signal processing in accordance with the "back to the present" capability. The system shown in FIG. 7 produces and stores time compressed audio information which is output during playback mode. Although it might appear that compressing audio information would make the audio information unintelligible, one primary purpose of outputting audio information during playback is to provide to a user the speech that occurred during the playback interval. Speech is not continuous, i.e., there are pauses in speech, and compression can take advantage of the pauses to retain most of the speech information and substantially maintain the intelligibility of the speech. In FIG. 7, it is assumed that the audio signal is not available in a digital form. The analog audio signal is first applied to a low pass filter 71 having a cut-off frequency of 10 kHz. The signal is then coupled to an automatic gain controlled amplifier 72 that keeps the audio signal amplitude within a useful voltage range for the following A/D conversion 73. The sampling clock of the A\D converter is chosen to be 22 kHz. The A/D converter output signal is applied to the data reduction circuit 723 and then processed in a manner similar to that of the video signal using memory 724, control circuit 727, memory address control units 7201, 7202, 7203 and 7204 shown in FIG. 7. As indicated in FIG. 7, the size of the DRAM needed for audio processing is 2 MB. This audio memory size is calculated as shown by the example provided below. The playback audio digital information is converted to analog signal "past audio signal" using digital to analog converter 74. Analog switch 75 selectively outputs either the present or the past audio analog signal in response to signal "past/present". Signal past/present in FIG. 7 may be the same signal as that generated in the video channel.

The following example demonstrates the operation of the described system. The example refers to the embodiment shown in FIG. 2 and assumes PAL standard signals.

Video Processing:

1. Compression factor:

$$F = (\text{no. of fields written in 1 sec}/\text{no. of fields read in 1 sec})$$
$$= 25/50$$
$$= 1/2$$

2. Number of fields "M" stored in the 32 MB DRAM:

One field contains 64 lines.

One line contains 128 data samples, "bytes".

Thus, one field contains 64×128=8192 bytes.

Total number of available memory cells in bytes= 33554432 bytes.

Fields "M" stored in the DRAM=33445532/8192=4096 fields.

This number of fields corresponds to:

$$(4096 \times T_{field}) \text{ sec} = 4096 \times 20 \text{ ms} = 81.92 \text{ sec} = 1.365 \text{ min}.$$

This time is referred to here as store time $T_{store}$.

That is, $T_{store}$=81.92 sec=1.365 min.

Actually, $T_{store}$ represents $\{(4096/F) \times T_{field}\}$ seconds of video information that can be reviewed by the user. This time is designated here as info time $T_{info}$, That is, $T_{info}$=4096×2×20 ms=163.84 sec=2.7307 min.

3. Playback time $T_{playback}$ can be calculated as follows:

(a) While reading the stored 4096 fields, new 2048 fields must be stored, (4096×F).

(b) While reading the 2048 fields stored in (a), new 1024 fields must be stored.

(c) While reading the 1024 fields stored in (b), new 512 fields must be stored.

(d) While reading the 512 fields stored in (c), new 256 fields must be stored . . . and so on.

The sum of these fields=

$$4096+2048+1024+512+ \ldots +8+4+2+1+0.5+0.25+ \ldots$$

which represents the total number of fields that must stored until the past and the present fields coincide.

This sum is a mathematical series known as "the geometrical series", the sum of which is equal to:

$$4096/(1-½)=4096×2=8192 \text{ fields}$$

Thus $T_{playback}=8192×20$ ms$=2.7307$ min
In general, $T_{playback}=M/(1-F)×T_{field}$
Audio Processing:
$T_{info}=163.84$ sec
Number of samples per second=22000 samples
Total number of samples=22000×163.84=3604480 Bytes
Compression factor F=½
Total number of stored data=3604480/2=1.802240 Mbytes
Thus 2 MB DRAM is enough to store the audio signal.

What is claimed is:

1. A method of processing a received video signal representing a video program, comprising the steps of:
   processing digital data representing a portion of the video program occurring during a first interval for producing a first signal component, the first signal component representing the portion of the video signal compressed in time;
   providing an output signal having the first signal component during a second interval; and
   replacing the first signal component in the output signal with a second signal component representing an input video signal at the end of the second interval, the first signal component not including any time related information added thereto, the replacing step including
   counting fields of video information occurring in the input video signal, determining when a count of fields of video information corresponds to a predetermined count, and decoupling the first signal component from the output signal and coupling the second signal component to the output signal when the count of fields of video information corresponds to the predetermined count.

2. The method of claim 1, wherein the step of processing the digital data comprises the steps of:
   receiving digital data representing a plurality of fields of video information included in the portion of the video programs;
   writing a fraction of the plurality of fields of video information to a memory at a first rate;
   reading the stored fraction of the plurality of fields of video information from the memory at a second rate; and
   processing the fields of video information read from the memory to produce the first signal component.

3. The method of claim 2, wherein the second rate is faster than the first rate.

4. The method of claim 3, wherein the step of writing to the memory occurs simultaneously with the step of reading from the memory and wherein data is read from a memory location before data is written to a memory location.

5. The method of claim 4, wherein the fraction of the plurality of fields of video information is ½.

6. The method of claim 2, wherein the output signal is suitable for coupling to a display device for producing an image having first and second regions, the first region displaying an image in response to the first signal component and the second region displaying an image in response to the second signal component.

7. The method of claim 6, wherein the second display region displays a main image and the first display region displays an auxiliary image inset into the main image or outside of the main image.

8. Apparatus for processing a received video signal representing a video program, comprising:
   means for processing digital data representing a portion of a video program occurring during a first interval for producing a first signal component, the first signal component representing the portion of the video signal compressed in time, the first signal component not including any time related information added thereto;
   means for providing an output signal having the first signal component during a second interval, and for replacing the first signal component in the output signal with a second signal component representing an input video signal at the end of the second interval, the providing means including
      means for counting fields of video information occurring in the input video signal,
      means for determining when a count of fields of video information corresponds to a predetermined count, and
      means for decoupling the first signal component from the output signal and for coupling the second signal component to the output signal in response to the count of fields of video information corresponding to the predetermined count; and
   means for detecting the end of the second interval.

9. The apparatus of claim 8, wherein the processing means includes:
   means for receiving digital data representing a plurality of fields of video information included in the portion of the video programs;
   means for writing a fraction of the plurality of fields of video information to a memory at a first rate;
   means for reading the stored fraction of the plurality of fields of video information from the memory at a second rate; and
   means for processing the fields of video information read from the memory to produce the first signal component.

10. The apparatus of claim 9, wherein the providing means provides an output signal suitable for coupling to a display device for producing an image having first and second regions, the first region displaying an image in response to the first signal component and the second region displaying an image in response to the second signal component.

11. The apparatus of claim 10, wherein the second display region displays a main image and the first display region displays an auxiliary image inset into the main image or outside of the main image.

* * * * *

UNITED STATES PATENT AND TRADEMARK OFFICE
CERTIFICATE OF CORRECTION

PATENT NO. : 6,636,271 B1
DATED : October 21, 2003
INVENTOR(S) : Megeid

It is certified that error appears in the above-identified patent and that said Letters Patent is hereby corrected as shown below:

<u>Title page,</u>
Item [86], PCT No., please delete "Nov. 9, 2000" and insert -- Nov. 6, 2000 --.

Signed and Sealed this

Twenty-fifth Day of October, 2005

JON W. DUDAS
*Director of the United States Patent and Trademark Office*